UNITED STATES PATENT OFFICE.

TALIAFERRO P. SHAFFNER, OF LOUISVILLE, KENTUCKY.

IMPROVED EXPLOSIVE COMPOUND FOR USE IN FIRE-ARMS, BLASTING, &c.

Specification forming part of Letters Patent No. 93,752, dated August 17, 1869.

*To all whom it may concern:*

Be it known that I, TALIAFERRO P. SHAFFNER, of the city of Louisville, State of Kentucky, have made a new and useful invention or discovery for blasting and artillery purposes, which I call "Selenitic Powder," of which the following is a specification:

The nature of my invention or discovery is as follows: I mix nitroleum or nitro-glycerine with granulated plaster-of-paris, calcined or not, as may be desired.

I adopt two modes, by preference. First. I use plaster-of-paris ground to a small grain, usually called screenings. This granulated plaster-of-paris is capable of absorbing water about fifteen per cent. of its weight, and of nitro-glycerine about twenty-five per cent. of its weight, and, in practice, I mix one pound of nitro-glycerine to two pounds of plaster-of-paris. Thus mixed, the nitro-glycerine lies upon the surface of the grains of the plaster-of-paris after the grain becomes thoroughly filled. In order to prevent the mixed plaster-of-paris and the nitro-glycerine from being too wet to allow a separation of the grains, I cover them with red lead, plumbago, or other equivalent substances. The lead dries and becomes hard, giving a coating to each grain, and thus I make a powder that can be poured in the same manner that can be done with gunpowder.

I sometimes allow the plaster-of-paris to absorb moisture from the atmosphere with the view of clearing the nitro-glycerine, subsequently mixed with the plaster-of-paris, from any acid that might remain in it, thereby preventing the possibility of decomposition of the nitro-glycerine. This is not necessary, however, as the plaster-of-paris will absorb the acid, and thus free the nitro-glycerine from any acid that might remain in it after manufacture, but the absorption of the acids reduces the quantity of the nitro-glycerine.

Ordinary calcined plaster-of-paris weighs eighty pounds to the bushel of one thousand eight hundred and forty-eight cubic inches; not calcined, about seventy-two pounds to the bushel, and calcined screenings about sixty-five pounds to the bushel.

The plaster-of-paris thus saturated, either coated with red lead, &c., or otherwise, may be pressed to a cake or in a cylinder ready for use in the field for blasting, &c.

To explode this new powder it is necessary to have a very strong percussion-cap, say, one containing about ten grains of fulminate or detonating powder usually employed in percussion-caps for rifles, &c. The more compact the powder lies in the presence of the percussion-cap the easier it will be to produce an explosion of the powder.

Second. My other mode employs finely-ground and sifted calcined plaster-of-paris. This absorbs a greater quantity of nitro-glycerine than the granulated, and will more effectively set or solidify. The proportions can be regulated to suit circumstances, but I prefer one cubic part of nitro-glycerine to two cubic parts of plaster-of-paris, or thirteen pounds of the former to twenty pounds of the latter. Thus mixed, I prefer to press it to a solid condition in a canister or tube, to a cake or cylindrical form. When pressed, an opening should be left sufficient to allow the percussion-cap, before described, to be well fitted into the powder, and the more confined the better.

This solidified powder will be extremely difficult to explode, and the confinement of the cap in the midst of the powder must be commensurate with the necessities of the case, illustrated as follows: I take an iron tube ten inches long, with one end closed; this fill with the powder, compressed as much as possible; then place the percussion-cap about two inches into the powder, and then fasten the end with a metallic cap or plug screwed onto the tube, having the igniting-fuse passing through the cap, with the percussion-cap on the end of the fuse well buried, as above mentioned, into the powder. Thus placed, the percussion-cap will explode the powder. Unless well confined it will not explode.

In drill-holes the confinement must be equally regarded, and in shells for military purposes the percussion-cap in like manner should be placed on the end of the fuse inside of the shell.

Having thus described the nature of my invention or discovery, the process of manufac- turing and using the same sufficiently clear and distinct to enable one skilled in the arts to which it belongs to make and use the same, what I claim, and desire to secure by Letters Patent, is—

The mixing of nitroleum or nitro-glycerine with plaster-of-paris, or equivalent substances, in such manner as will make or produce an explosive compound or mixture, in the manner and substantially as herein described.

TAL. P. SHAFFNER.

Witnesses:
   JAMES DEVEAU,
   W. M. SHAFFNER.